Figure 1:
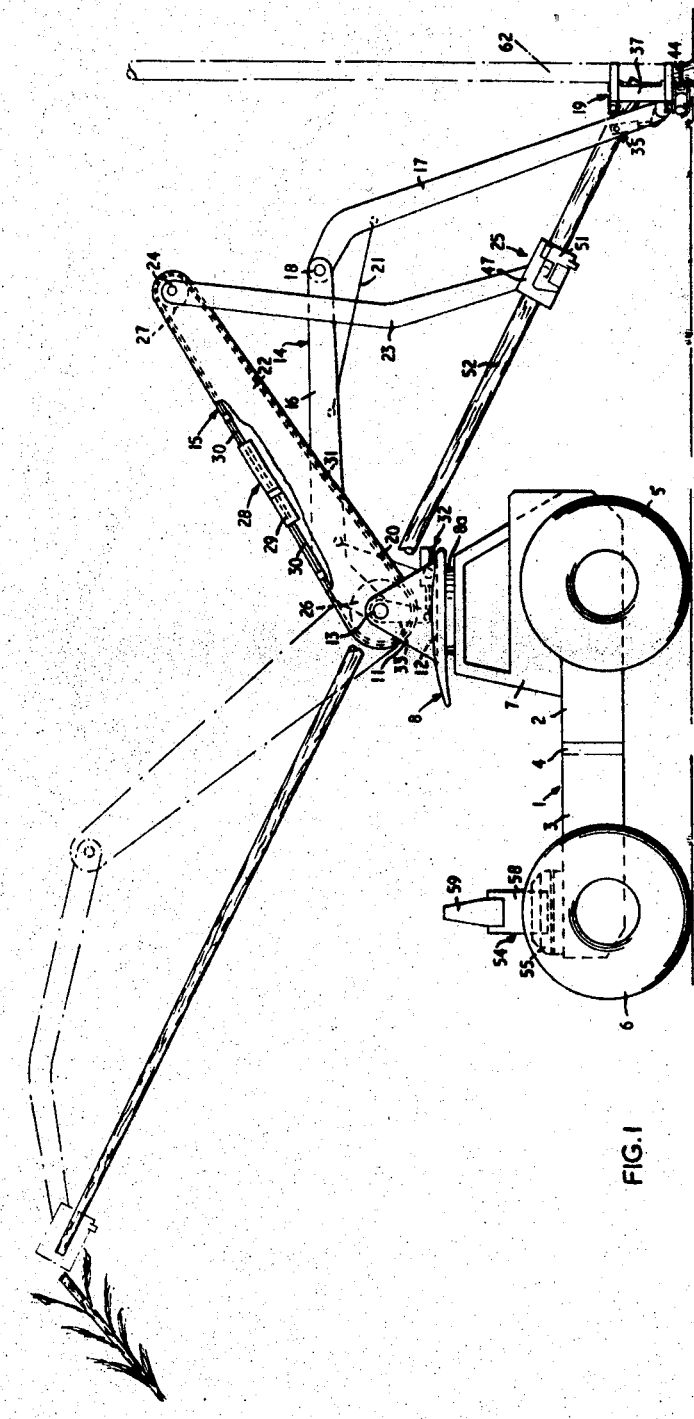

United States Patent

[11] 3,554,245

| [72] | Inventor | John E. Eynon |
| | | Port Arthur, Ontario, Canada |
| [21] | Appl. No. | 745,238 |
| [22] | Filed | July 16, 1968 |
| [45] | Patented | Jan. 12, 1971 |
| [73] | Assignee | Abitibi Paper Company Ltd. |
| | | Toronto-Dominion Centre, Toronto, Canada |
| [32] | Priority | Apr. 25, 1968 |
| [33] | | Canada |
| [31] | | 18,387 |
| | | Continuation-in-part of Ser. No. 704,016, Feb. 8, 1968 |

[54] FELLER-LIMBER-BUNCHER LOGGING MACHINE
45 Claims, 38 Drawing Figs.

[52] U.S. Cl..................................................... 144/3, 144/34

[51] Int. Cl...................................................... A01g 23/08
[50] Field of Search......................................... 144/2(21), 3(4), 34, 34(1-6), 309(34)

[56] References Cited
UNITED STATES PATENTS
3,323,563  6/1967  Larson .......................... 144/2

*Primary Examiner*—Gerald A. Dost
*Attorney*—Stevens, Davis, Miller & Mosher

ABSTRACT: A tree harvesting machine includes a mobile carrier 1 upon which a felling boom assembly 14 and a limbing boom assembly 15 are pivotally mounted. A tree is severed and lowered to a limbing position by the felling boom assembly 14 and then while the tree is held by the felling boom assembly 14, the limbing boom assembly 15 removes the limbs. The limbed tree is then moved to a bunching position, with or without the assistance of the limbing boom assembly.

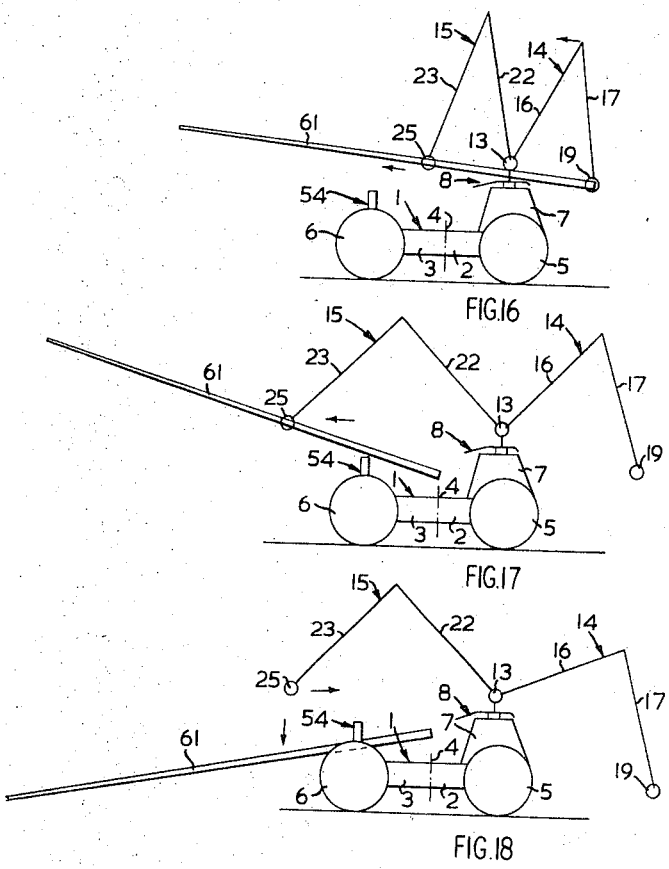

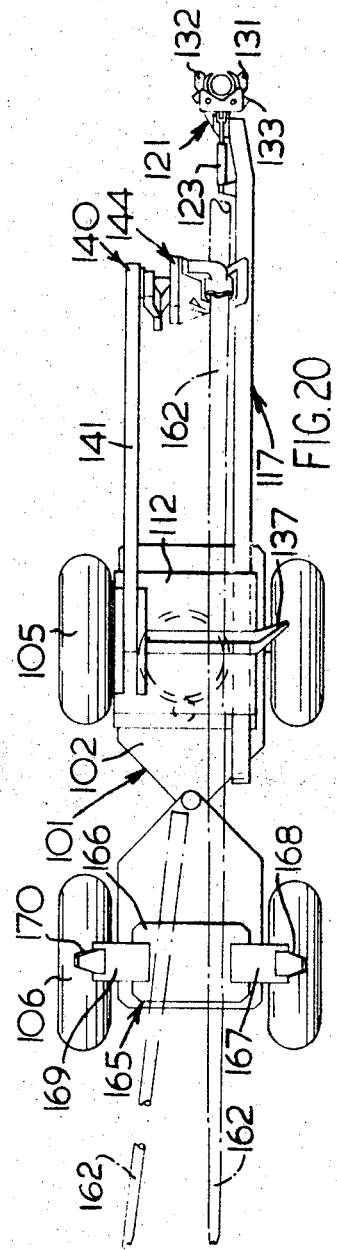

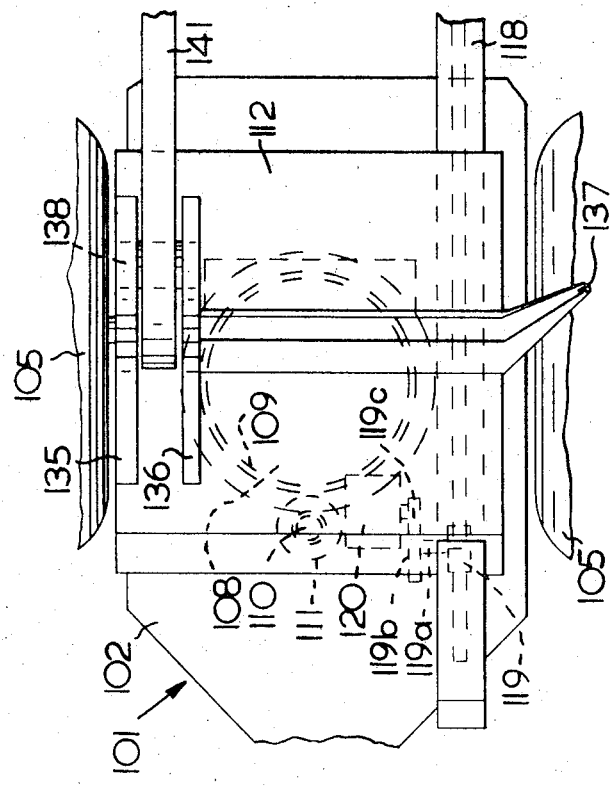

FELLER-LIMBER-BUNCHER LOGGING MACHINE

This application is a continuation-in-part of application Ser. No. 704,016 filed Feb. 8, 1968.

This invention relates to machines for harvesting trees, that is to say machines which fell trees by severing the trunks near the ground and limb trees by removing the limbs from the trunks.

There are several machines available for felling and/or limbing trees, but at the present time there is no suitable machine which can efficiently fell, limb and bunch trees. By bunching is meant the accumulation of a sufficiently large number of felled and limbed trees in such a manner as to make the subsequent transport of these to the roadside or landing economic. Existing machines suffer from the disadvantages of high cost, high weight, complexity, and limitations in maneuverability and capability of travel over difficult terrain.

One object of this invention is to provide a tree harvesting machine of sufficiently compact design to ensure high maneuverability and to suffer a minimum of restriction presented by steep slopes, rough or soft ground.

A further object of this invention is to provide a tree harvesting machine which will log effectively and efficiently areas where a residual stand of timber exists. A residual stand can consist of valuable immature trees, mature trees of a species or condition which for one reason or another are not suitable for harvesting at a given time. It will be appreciated then that a "residual stand" can present a very considerable obstruction to the operation of existing machines which because of their size and method of operation usually have to clear out the woods as they proceed.

Yet another object of this invention is to provide a tree harvesting machine which can sever a tree at the butt and while retaining hold of the butt incline the tree over the machine proper to a convenient angle and position for removal of the branches and top.

Yet another object of this invention is to provide a tree harvesting machine which after the operation of felling, limbing and topping can rapidly and conveniently place the processed tree on a load carrying bunk on the machine itself and proceed in this manner accumulating a load or bunch of tree length logs sufficiently large before depositing same so as to make subsequent loading and transportation of same convenient and economic.

According to this invention, a tree harvesting machine includes a mobile carrier upon which two pivoted boom assemblies are mounted, one boom assembly being a felling boom assembly and the other boom assembly being a limbing boom assembly. A tree is severed and lowered to a limbing position by the felling boom assembly and while held by the felling boom assembly, the limbing boom assembly removes the limbs. The limbed tree length is then moved to a bunching position, with or without the assistance of the limbing boom assembly.

The mobile carrier may be wheeled or may be tracked. The carrier may be articulated so as to have a forward part pivotable about a vertical axis relative to a rear part.

The felling boom assembly may include an inner arm having one end pivotally connected to the carrier for movement about a horizontal axis and an opposite end pivotally connected to one end of an outer arm for relative movement about a horizontal axis, the opposite end of the outer arm carrying a felling head having means operable to cut through a tree trunk and means for gripping the tree trunk above the cutting position.

The limbing boom assembly may similarly include inner and outer arms, the outer arm carrying a limbing head having means to remove limbs from a tree trunk and means to sever the tree top as the limbing head is moved along it.

The inner arms of both felling boom assembly and the limbing boom assembly may be mounted on a common horizontal shaft on the carrier. The carrier may include an operator's cabin, and the shaft may be mounted on the roof of the cabin. The shaft may be carried by a platform rotatably mounted on the top of the cabin for angular movement about a vertical axis. The platform may function as a support for a tree during the limbing operation.

Alternatively, the felling boom assembly may include an arm which is protractable and retractable relative to the carrier and which carries the felling head. The arm may have a fixed length and be movable to and fro relative to the carrier, or the arm may be a telescopic arm. The limbing boom assembly may be mounted on a housing which also carries the felling boom assembly, the housing being mounted on the carrier and pivotable relative to the carrier about a horizontal axis. This simplifies the alignment of the limbing boom assembly with a felled tree held by the felling boom assembly.

Figure 2:
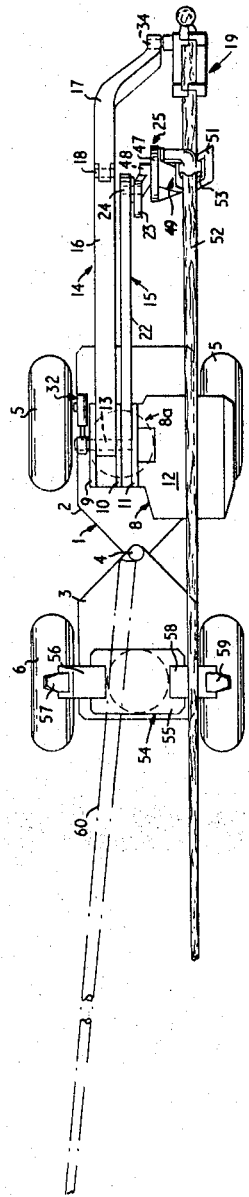
Figure 3:
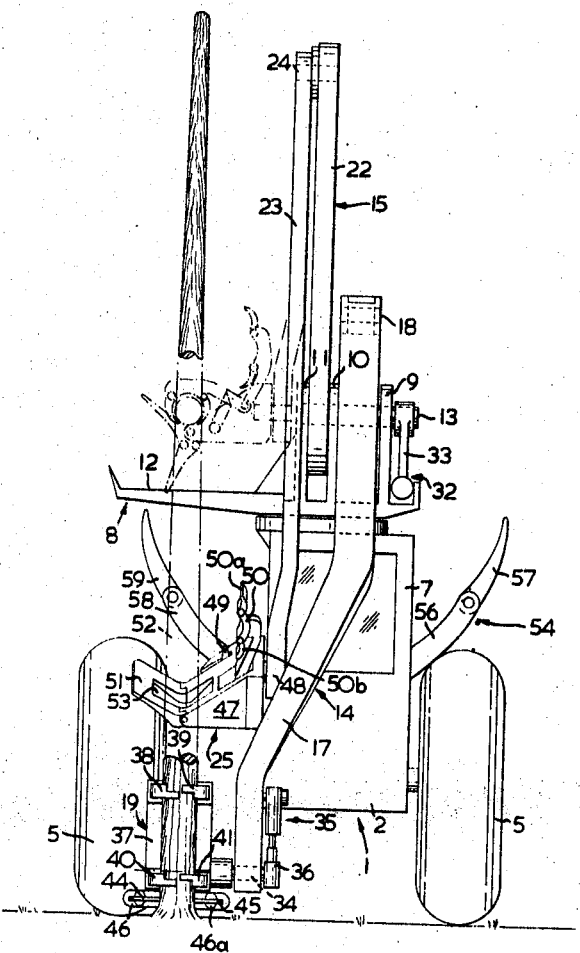
Figure 4:
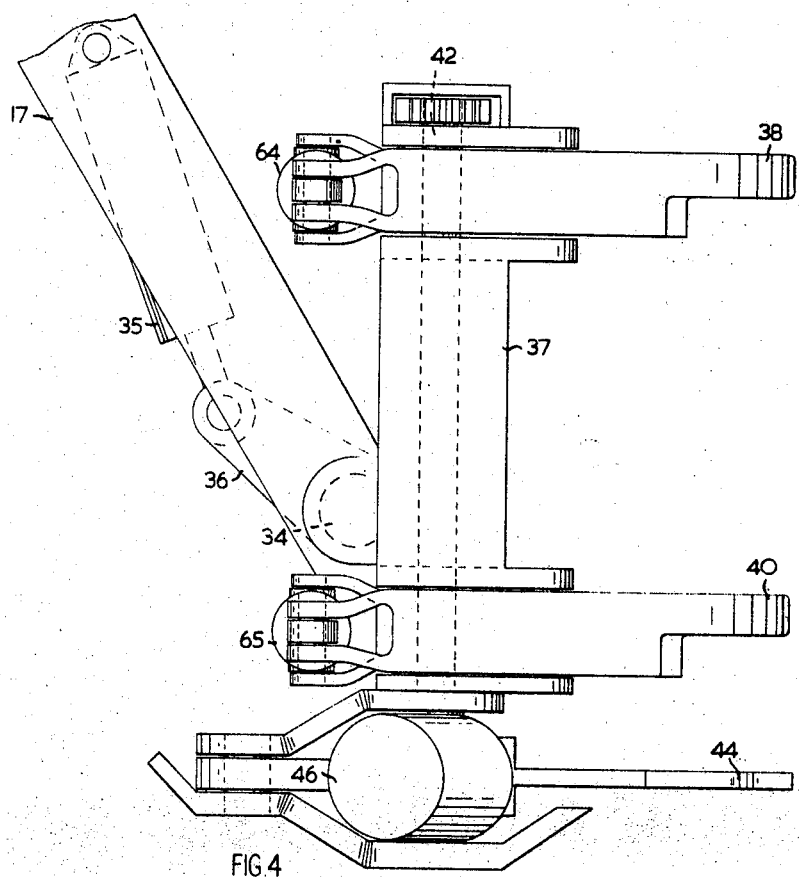
Figure 5:
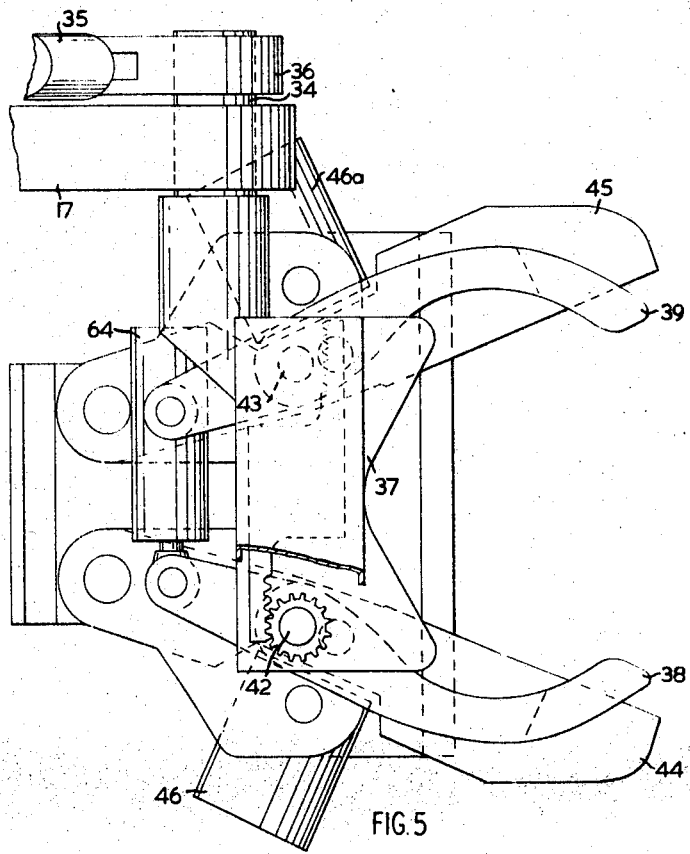
Figure 6:
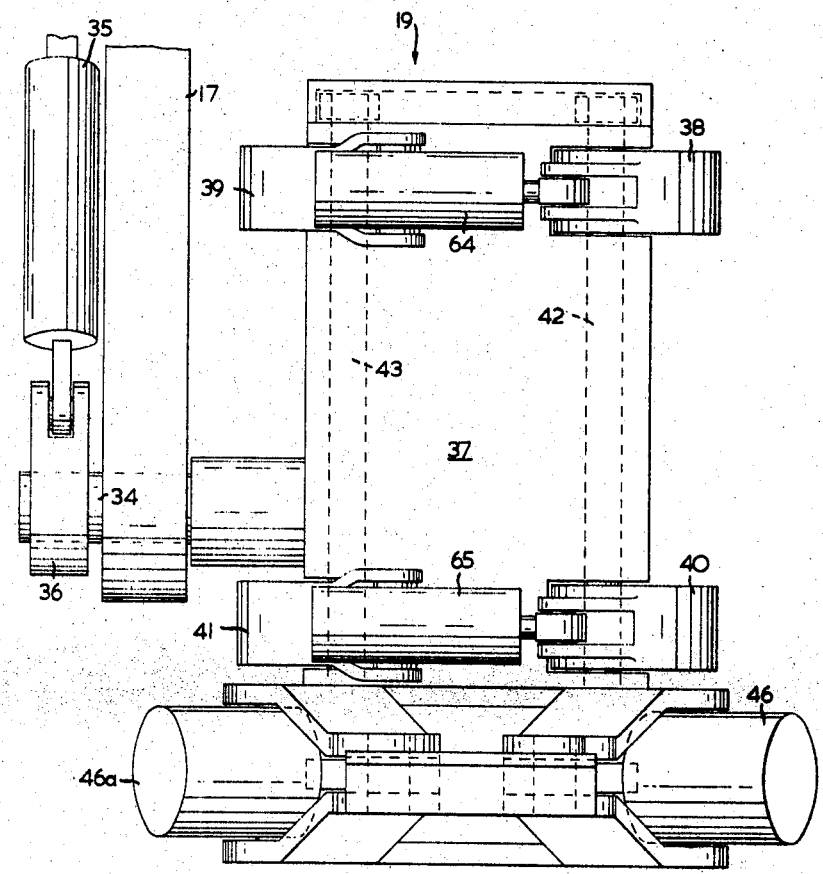
Figure 7:
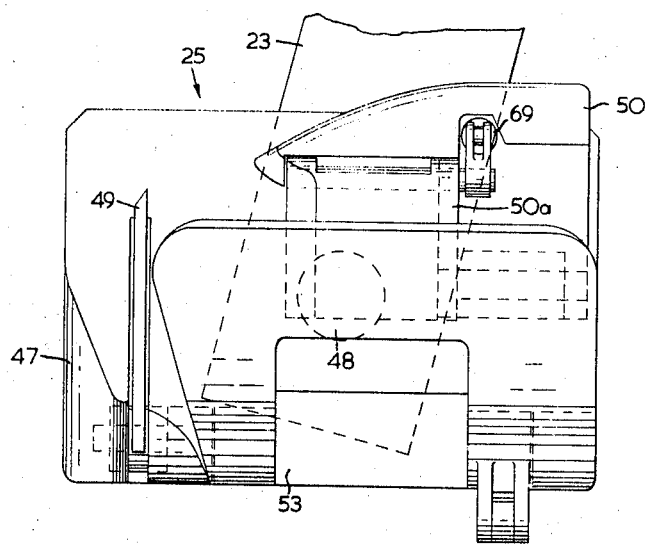
Figure 8:
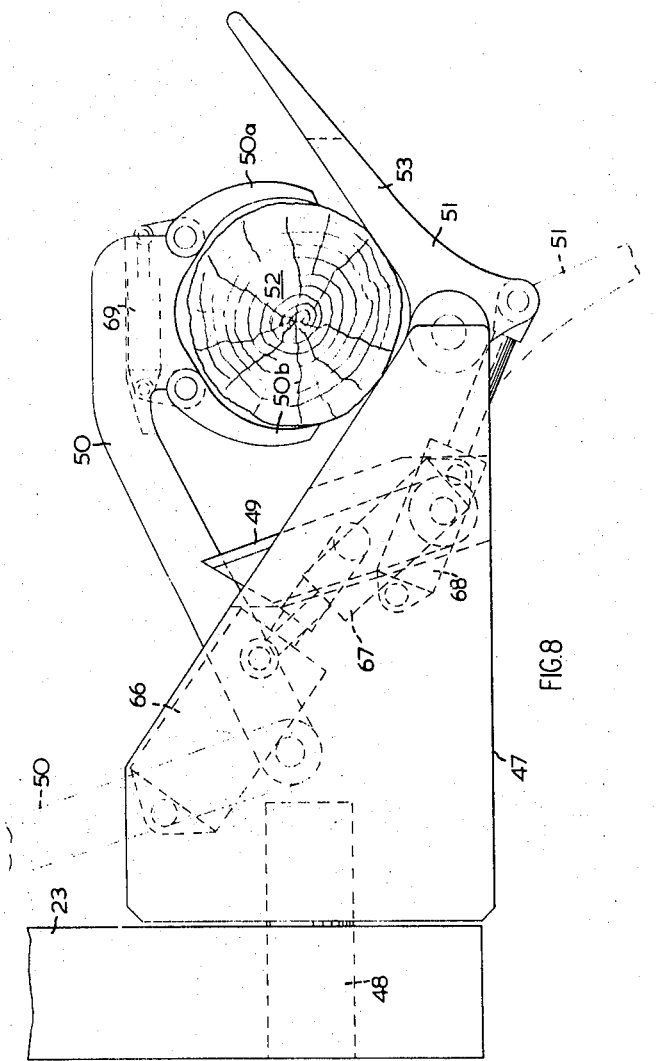
Figure 9:
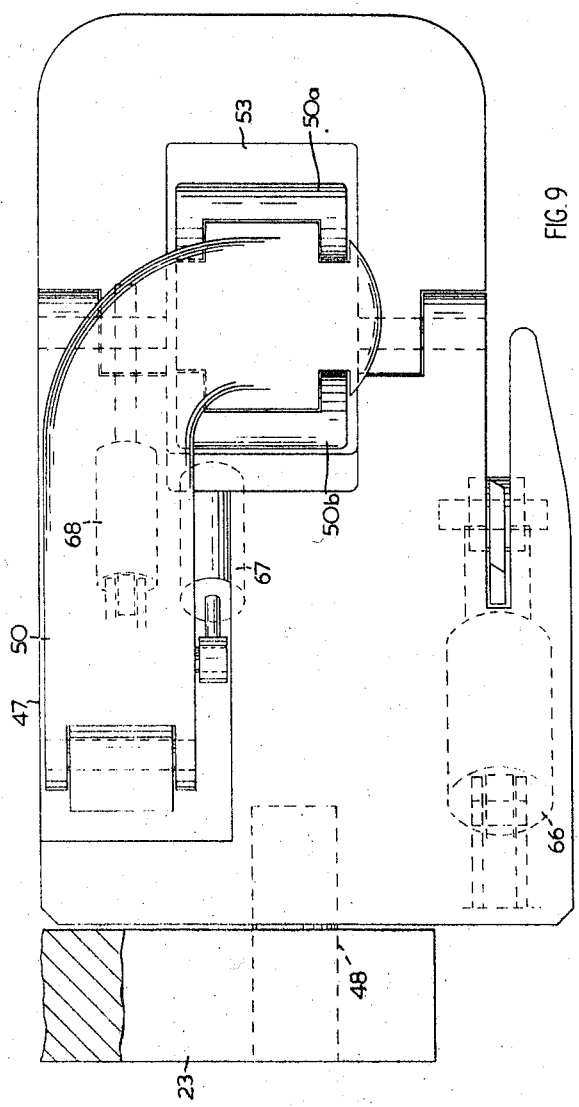
Figure 10:
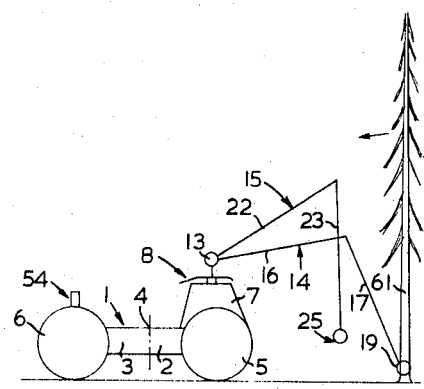
Figure 19:
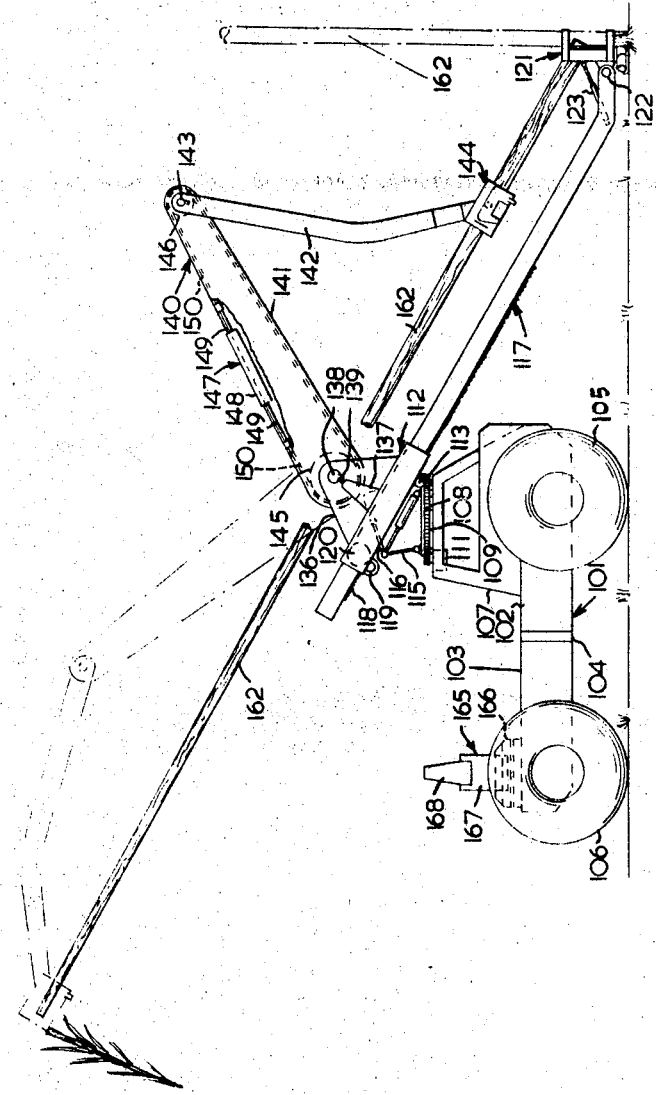
Figure 19A:
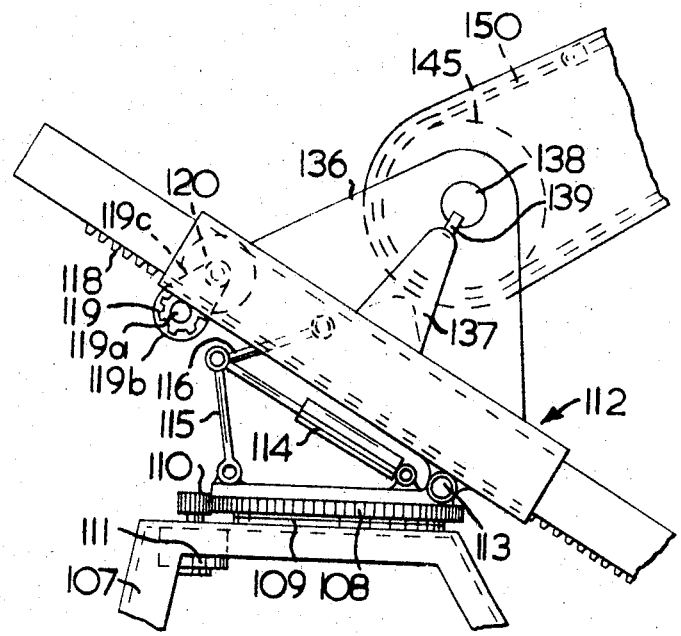
Figure 21:
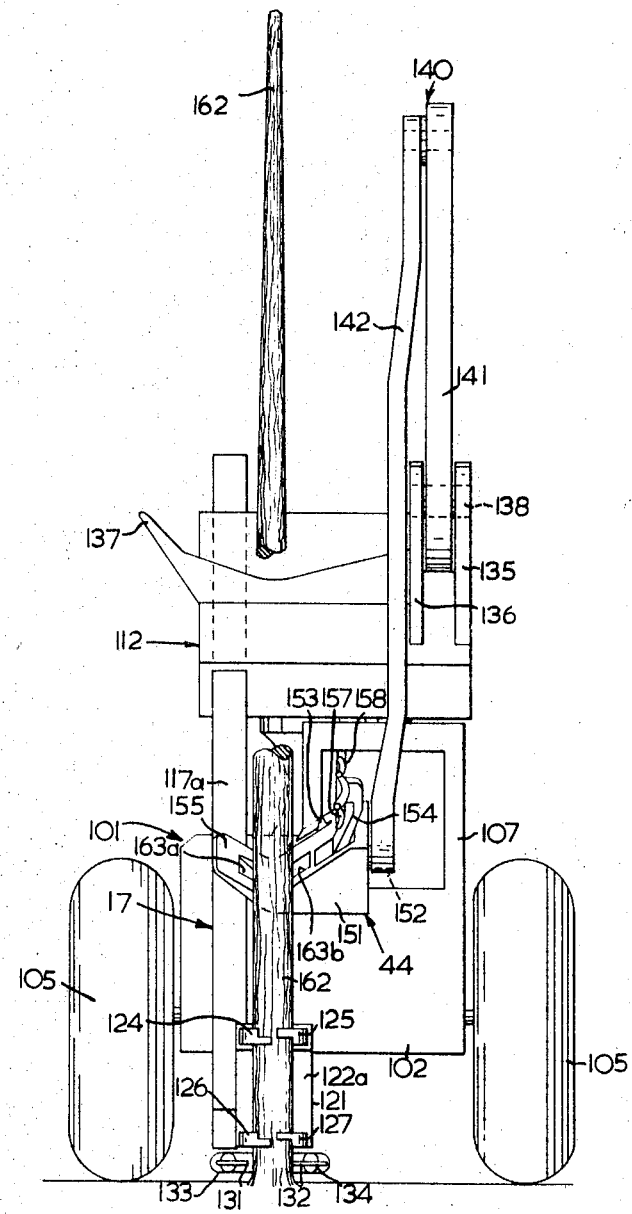
Figure 22:
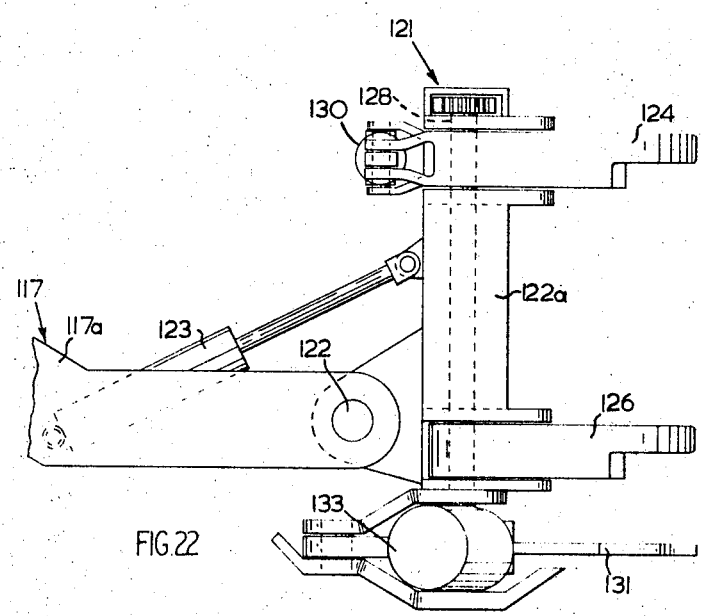
Figure 23:
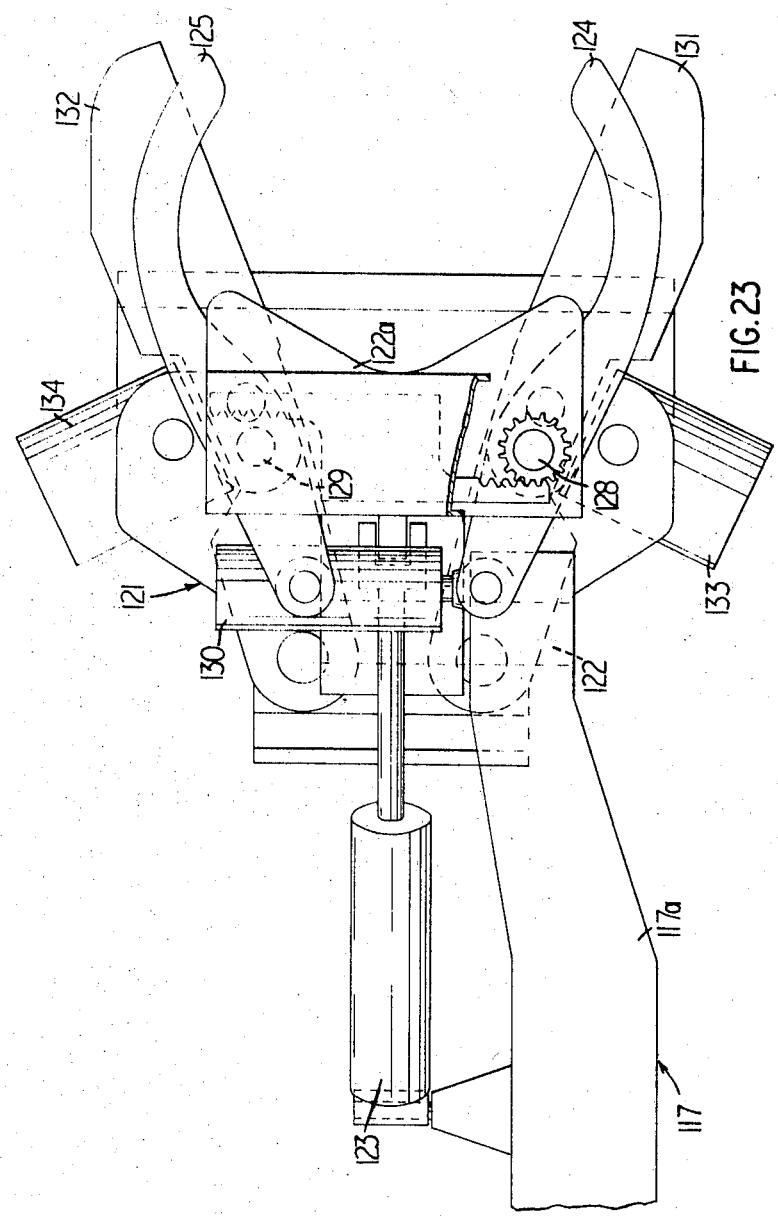
Figure 24:
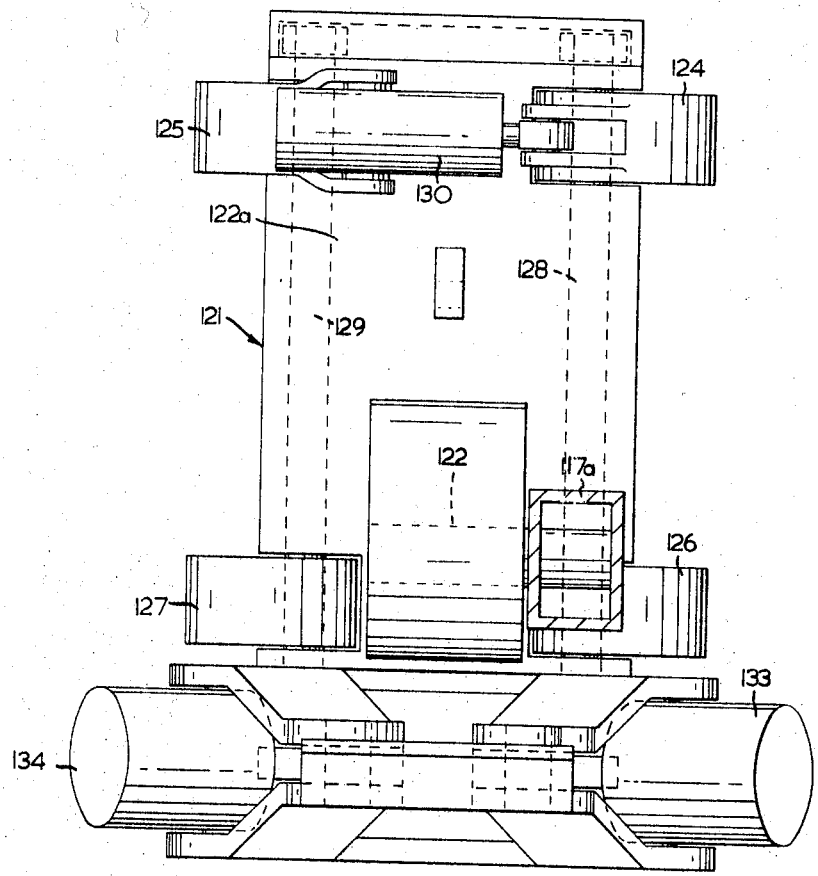
Figure 25:
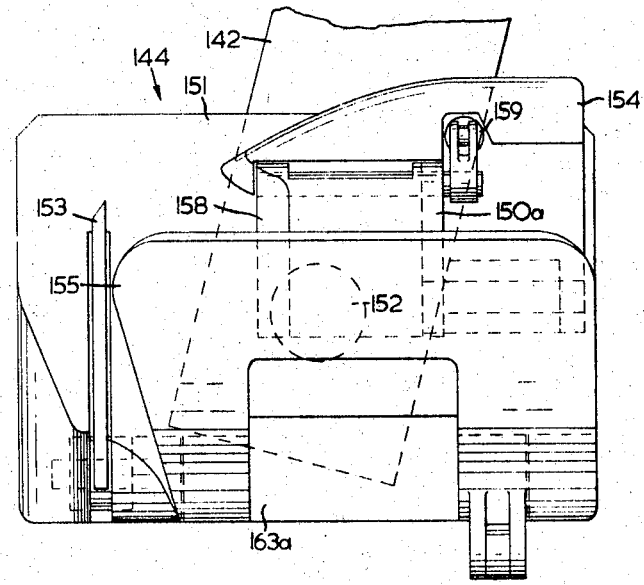
Figure 26:
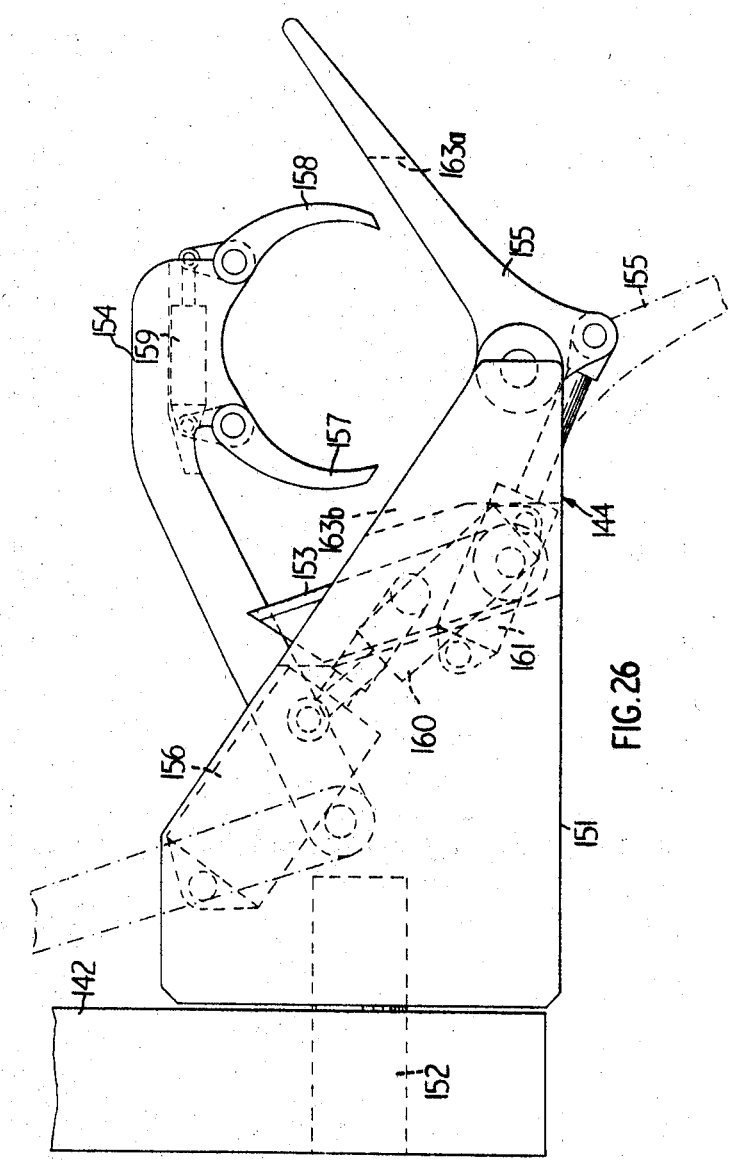
Figure 27:
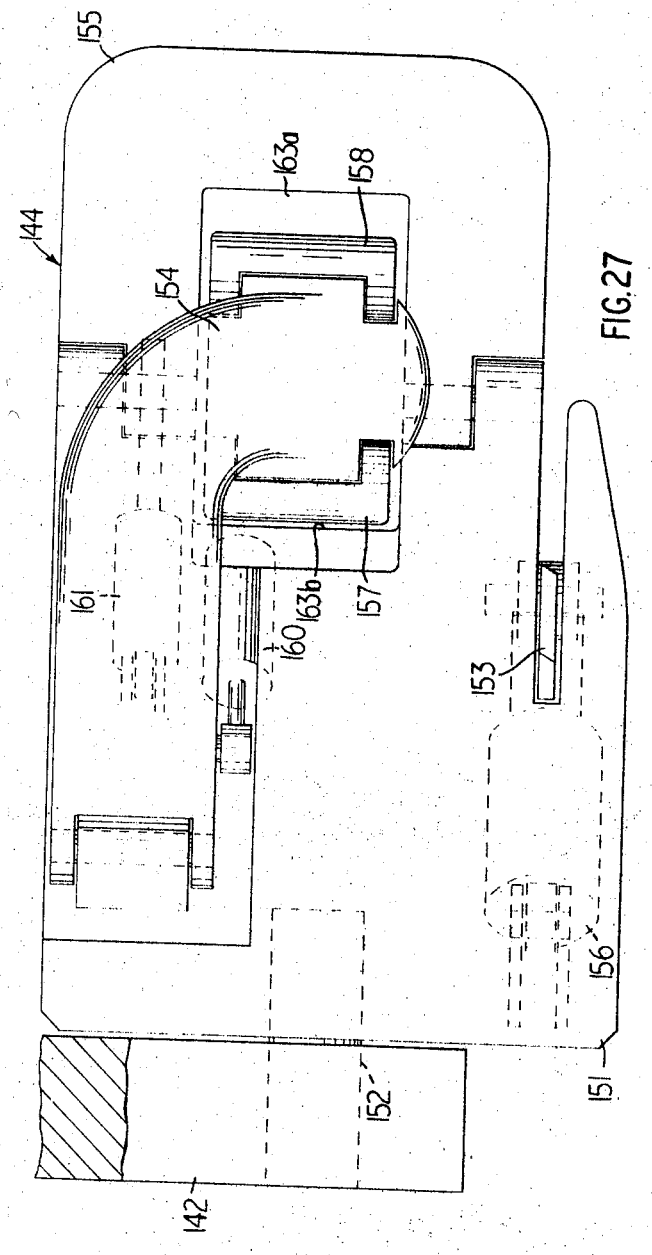
Figure 28:
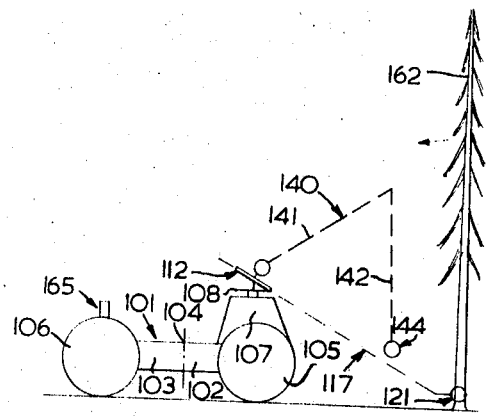

Two embodiments of the invention will now be described, by way of example, with reference to the accompanying drawings, of which, FIG. 1 is a side view of a tree harvesting machine according to one embodiment,
FIG. 2 is a plan view of the machine,
FIG. 3 is a front end view of the machine,
FIG. 4 is a side view of the felling head on an enlarged scale,
FIG. 5 is a plan view of the felling head,
FIG. 6 is a rear view of the felling head,
FIG. 7 is a side view of the limbing head,
FIG. 8 is a front view of the limbing head end,
FIG. 9 is a plan view of the limbing head,
FIGS. 10—18 are diagrammatic side views of the machine illustrating its sequence of operations,
FIG. 19 is a side view of a tree harvesting machine according to the second embodiment,
FIG. 19A is an enlarged view of a portion of FIG. 19,
FIG. 20 is a plan view of the machine,
FIG. 20A is an enlarged view of a portion of FIG. 20,
FIG. 21 is a front view of the machine,
FIG. 22 is a side view of the felling head on an enlarged scale,
FIG. 23 is a plan view of the felling head,
FIG. 24 is a rear view of the felling head,
FIG. 25 is a side view of the limbing head on an enlarged scale,
FIG. 26 is a front view of the limbing head,
FIG. 27 is a plan view of the limbing head, and
FIGS. 28—36 are diagrammatic side views of the machine, illustrating its sequence of operation.

Referring first to FIGS. 1—3, a tree harvesting machine includes an articulated wheeled carrier 1 having a forward part 2 and a rear part 3. The forward part 2 and rear part 3 are pivotally connected together for relative angular movement about a vertical axis by a hinge joint 4. The forward part 2 has a pair of driven forward wheels 5, and the rear part 3 has a pair of driven rear wheels 6. If desired however, tracks instead of wheels may be provided. The forward part 2 of the carrier 1 includes an operator's cabin 7 from which operation of the machine is controlled. The necessary prime mover for driving the forward and rear wheels 5, 6 and other parts to be described is carried by the forward part 2 adjacent the cabin 7.

On top of the cabin 7 is mounted a rotatable platform 8, the platform 8 being carried by a ball or roller type circular track 8a mounted on the cabin roof with a vertical axis rearwardly of the axle line of the front wheels 5. The platform 8 is rotatable through 360° and carries three horizontally-spaced upstanding parallel support brackets 9, 10, 11 the bracket 9 being located adjacent a side edge of the platform 8 and the bracket 10 being located near the side edge but further from it than the bracket 9. The bracket 11 is located on the opposite side of bracket 10 to the bracket 9. The brackets 9, 10, 11 and the space between them occupy only a minor part of the platform 8, the major part of the platform 8 forming a felled tree support deck 12.

The three brackets 9, 10, 11 support a horizontal main shaft 13 upon which a felling boom assembly 14 and a limbing boom assembly 15 are mounted, the felling boom assembly 14 being mounted between brackets 9 and 10 and the limbing boom assembly 15 being mounted between the brackets 10 and 11. The felling boom assembly 14 includes an inner felling boom arm 16 pivotally mounted at one end on the main shaft 13 and pivotally connected at the other end by a shaft 18 to one end of an outer felling boom arm 17, the shaft 18 allowing relative pivotal movement of the arms 16, 17 about a horizontal axis. The other end of the outer felling boom arm 17 carries a felling head 19, which will be described in more detail later. The felling boom assembly 14 is controlled by two hydraulic actuators or cylinders 20, 21 which are indicated diagrammatically in FIG. 1.

The actuator 20 is connected between the innner felling boom arm 16 and the platform 8, and the actuator 21 is connected between the inner felling boom arm 16 and outer felling boom arm 17. The actuators 20, 21 are connected to and powered by a hydraulic pump (not shown) carried by the carrier 1 and are controlled from the operator's cabin 7.

The limbing boom assembly 15 includes an inner limbing boom arm 22 pivotally mounted at one end on the main shaft 13 and pivotally connected at the other end by a shaft 24 keyed to one end of an 141 limbing boom arm 23, the shaft 24 allowing relative pivotal movement of the arms 22, 23 about a horizontal axis. The other end of the outer limbing arm 23 carries a limbing head 25, which will be described in more detail later. The inner limbing boom arm 22 (FIG. 1) contains a first sprocket 26 keyed to the main shaft 13 and a second sprocket 27, smaller than the sprocket 26, keyed to the shaft 24. The ratio of the diameter (and therefore number of teeth) of the first sprocket 26 to the second sprocket 27 is 2:1. The pivotal movement of the outer limbing boom 23 is then twice that of the inner limbing boom 22 so that the path of movement of outer end of the outer boom 23 which carries the limbing head 25 is a straight line. A hydraulic actuator 28 has its cylinder 29 secured to the inner limbing boom arm 22 and has its piston rod 30 projecting from opposite ends of the cylinder 29. A roller chain 31 has one end secured to one end of the piston rod 30, passes around sprockets 26 and 27, and has its other end secured to the other end of piston rod 30. A hydraulic actuator 32 is secured between the platform 8 and one end of a lever 33 whose other end is keyed to main shaft 13. The actuators 28, 32 are connected to and powered by a hydraulic pump carried by the carrier 1 and controlled from the operator's cabin 7. Various positions of the limbing boom assembly 15 are indicated in FIGS. 1—3.

An alternative method of providing the required movement of the limbing boom arms 22 and 23 would be the substitution of a first and second worm gear in place of the aforementioned first and second sprockets 26 and 27, the further substitution of a hydraulic motor driven shaft having a worm engaging first worm gear on one end and a second worm engaging said second worm gear on the other end. The ratio of the teeth on said first and second worm gear would be 2:1.

The felling head 19 shown in more detail in FIGS. 4—6, is pivotally connected for movement about a horizontal axis relative to the outer felling boom arm 17 by a shaft 34. A hydraulic actuator 35 is pivotally connected between the outer felling boom arm 17 and one end of a lever 36 whose other end is secured to the shaft 34. The felling head 19 includes a housing 37 secured to shaft 34 and carrying a pair of upper jaws 38, 39 and a pair of lower jaws 40, 41. The upper and lower jaws 38 and 40 respectively are mounted on a vertical shaft 42 carried by the housing 37, and the upper and lower jaws 39, 41 respectively are mounted on a vertical shaft 43. Relative movement between the upper and lower jaws 38, 40 on the one hand and the upper and lower jaws 39, 41 on the other hand to grip a tree 62 is caused by hydraulic actuators 64, 65 powered by equipment on the carrier 1 and controlled from the cabin 7. The felling head 19 also includes a pair of relatively-movable butt shear cutters 44, 45 located below the lower jaws 41, 40 and pivotally mounted on the housing 37. Relative movement between the cutters 44, 45 is caused by hydraulic actuators 46 and 46a powered by a hydraulic pump on the carrier 1 and controlled from the cabin 7.

The limbing head 25, shown in more detail in FIG. 7—9, includes a housing 47 secured to the outer limbing boom arm 23 by a shaft 48 and carrying three pivotally-mounted hydraulically-actuated parts, namely a topping shear 49, an upper limbing arm assembly 50 and a lower limbing arm assembly 51. The topping shear 49 is a cutter operable by a hydraulic actuator 66 to cut through a tree trunk. The limbing arm assembly 50 carries two hydraulically-actuated jaws 50a and 50b which are pivotally mounted on opposite sides of the arm 50. The limbing arms 50 and 51 and secondary jaws 50a and 50b are movable by hydraulic actuators 67, 68 and 69 between an open position in which a tree 52 can be positioned between them and a closed position in which the arms 50, 51 and secondary jaws 50a, 50b and the housing surround the tree 52, the jaws 50a and 50b projecting in the closed position into an aperture 53 in the lower arm 51 and housing 47. The actuators operating the arms 50, 51 and secondary jaws 50a, 50b are powered by a hydraulic pump on the carrier 1 and controlled from the cabin 7. The actuator 66 operating the topping shear 49 is automatically actuated to cut through the tree when the arms 50 and 51, close to a predetermined diameter. This action also cuts off power to the actuator 28.

The limbing head 25 is capable of angular movement about shaft 48 and is self-aligning, being either ballasted or spring-loaded in such a manner that when free it returns to a desired position for tree trunk engagement. Once clamped on a tree trunk, the limbing head 25 assumes the angle of incidence dictated by the lay of the tree trunk.

The rear part 3 of the carrier 1 supports a log cradle 54 which includes a base 55 mounted for rotation about a vertical axis on the rear part 3, a first pair of clamps 56, 57 on one side of the base 55 and a second pair of clamps 58, 59 on the opposite side of the base 55. One end of clamp 56 is pivotally secured to the base 55, and the other end of clamp 56 is pivotally secured to one end of clamp 57, such that the clamp 57 is pivotable relative to clamp 56 and the clamp 56 is pivotable relative to the base 55 about horizontal axes. The pairs of clamps 56, 57 and 58, 59 face one another and are movable by hydraulic actuators (not shown) between an open position in which limbed and topped tree lengths 60 can be placed on the base 55 and a closed position in which the clamps 56, 57 and 58, 59 hold tree lengths 60 on the base 55 as they are transported by the machine. The hydraulic actuators for operating the clamp 56, 57 and 58, 59 and the mechanism for rotating the base 55 are powered by a hydraulic pump mounted on the carrier 1 and controlled from the cabin 7.

The operation of the machine will now be described with reference to FIGS. 10—18 as well as to FIGS. 1—9. The operator positions the machine in front of a tree 61 (FIG. 10) and operates the felling boom assembly 15 (and rotates platform 8 if necessary) to cause the upper jaws 38, 39 and lowers jaws 40, 41 of the felling head 19 to grip the tree near the ground. The operator then causes the butt-shear cutters 44, 45 to cut through the tree trunk.

Figure 11:
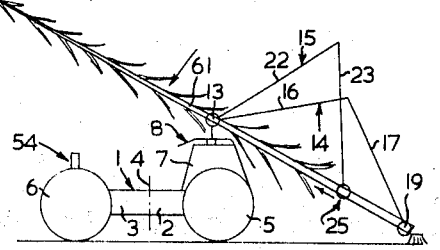
Figure 12:
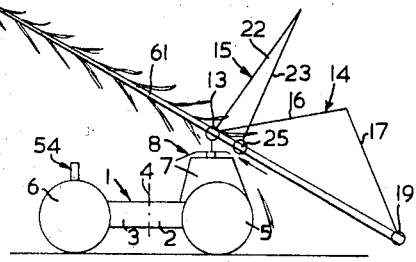
Figure 13:
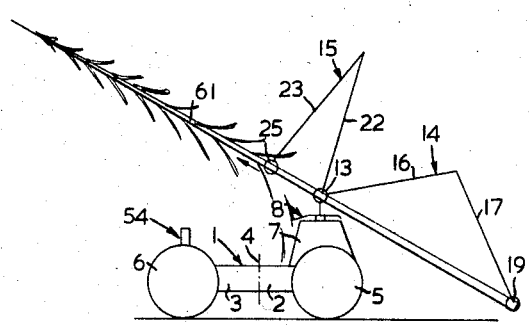
Figure 14:
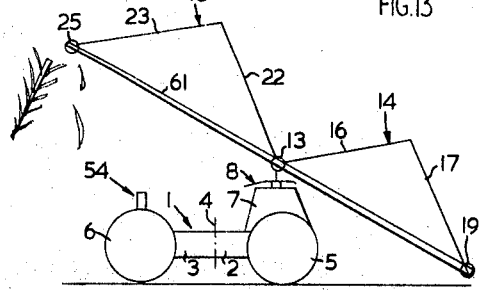

With the limbing boom assembly 15 already in a suitable position, adjustable by operation of the actuators 32 and 28, the felling head 19 is rotated by operation of jack 35 until the tree 61 is partially felled to an inclined position and engages the support deck 12. The limbing head 25 is raised until the housing 47 engages the tree 61, and the limbing arms 50, 51 and jaws 50a, 50b are closed (FIG. 11). Hydraulic actuator 28 (which powers the limbing boom assembly 15) is energized, moving both limbing arms 22 and 23 in separate parallel vertical arcs and propelling the limbing head 25 in a straight line adjacent and parallel to the tree trunk 61 thereby removing the limbs from the tree trunk. During this operation the outer limbing arm 23 passes the inner limbing arm 22 (FIG. 12 and 13). The inner and outer limbing arms 22, 23 are equal in length and, since the main shaft 13 is spaced above the support deck 12, the tree 61 is momentarily raised above the deck 12 by the limbing head 25 as the outer limbing arm 23 passes the inner limbing arm 22. When the limbing head 25 reaches a point on the tree stem near the top and the upper limbing tool arm 50 has closed to the preset diameter for cut off, hydraulic power to actuator 28 is automatically cut off and movement of the limbing boom assembly ceases; simultaneously the topping shear 49 is automatically actuated to remove the top portion of tree 61 (FIG. 14).

Figure 15:
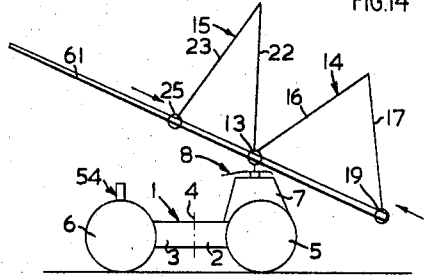

The operator now reverses the direction of travel of the limbing head 25 (FIG. 15) simultaneously projecting the now felled, limbed and topped tree 61 rearwardly, sliding on and over platform 8 and support deck 12 (FIGS. 15 and 16).

During this operation, the operator rotates the felling and limbing boom assemblies and consequently tree 61 to the degree required to align tree 61 with long axis of the carrier 1 and place the tree above and over the log cradle 54. When the limbing head 25 has been returned to approximately the midpoint of tree 61, retraction of the limbing boom assembly and head ceases, the operator releases the holding jaws of felling head 19 and activates the limbing boom assembly drive mechanism in a reverse direction in such a manner as to carry the tree 61 rearward across the platform 8 and support deck 12 (FIG. 17). This operation proceeds until the butt end of tree 61 clears the support deck 12. The tree 61 is now released and is dropped or placed between the clamps 56, 57 and 58, 59 of log cradle 54 (FIG. 18).

The tree harvesting and loading cycle is repeated until all the trees within reach have been harvested. The operator then secures his load by operation of the jaws 56, 57, 58, 59 of the log cradle 54 and drives the machine to another position from which further trees are harvested. When the log cradle 54 is full, the machine is driven to a suitable position, and the logs are deposited.

If desired, after limbing and topping, a tree may be transferred to the log cradle 54 without using the limbing boom assembly 15. In this case, the limbing head 25 is freed from the tree after limbing and topping and, with the tree held by the felling head 19, the platform 8 is rotated and the felling boom assembly 14 operated to bring the felling head 19 into a position between the platform 8 and the log cradle 54. The felling head 19 is then rotated by means of the jack 35 until the tree lies on the log cradle 54, and the felling head 19 is then caused to release the tree.

In the machine which has been described and illustrated, both the felling boom assembly 14 and the limbing boom assembly 15 are mounted adjacent to one another on a common shaft 13 located near one side edge of the platform 8, and the support deck 12 extends from the bracket 11 across the remainder of the platform 8. If desired, the felling boom assembly 14 and the limbing boom assembly 15 may be mounted on separate spaced shafts such that the support deck is formed by a portion of the platform lying between the felling boom assembly 14 and the limbing boom assembly 15. The operation of felling, limbing and topping would then take place between the felling and limbing boom assemblies 14 and 15.

Referring now to FIGS. 19 to 21, a tree harvesting machine includes an articulated wheeled carrier 101 having a forward part 102 and a rear part 103. The forward part 102 and rear part 103 are pivotally connected together for relative angular movement about a vertical axis by hinge joint 104. The forward part 102 has a pair of driven forward wheels 105, and the rear part 103 has a pair of driven rear wheels 106. If desired, however tracks may be provided instead of wheels. The forward part 102 of the carrier 101 includes an operator's cabin 107 from which operation of the machine is controlled. The necessary prime mover for driving the forward and rear wheels 105, 106 and other parts to be described is carried by the forward part 102 adjacent the cabin 107.

On top of the cabin 107 is mounted a rotatable platform 108, the platform 108 being carried by a ball or roller bearing circular track 109. The platform 108 is rotatable through 360° about a vertical axis located rearwardly of the axle of the front wheels 105. A ring gear secured to the platform 108 is engaged by a pinion 110 driven by a rotary hydraulic motor 111 carried by the cabin 107. Rotation of the pinion 110 by the hydraulic motor 111 causes rotation of the platform 108.

A boom-carrying assembly 112 is carried by the rotatably platform 108 and is connected to the forward part of the platform 108 by a horizontal shaft with bearings forming a hinge joint 113. A first link 115 has one end pivotally connected to the rear part of the platform 108 and its other end pivotally connected to one end of a second link 116, the other end of the second link 116 being pivotally connected to the housing 112. A linear hydraulic actuator 114 has one end pivotally connected to the platform 108 near the hinge joint 113 and has the other end pivotally connected to the junction of the two links 115, 116. The actuator 114 is operable to pivot the boom-carrying housing 112 through an arc of approximately 60° about the hinge joint 113.

A felling boom assembly 117 is slidably mounted on the housing 112 adjacent one side edge of the housing 112. The felling boom assembly 117 includes a main arm 117a extending forwardly from the housing 112. A rack 118 secured to the lower edge of the main arm 117a engages a pinion 119 carried by a shaft 119a rotatably mounted on the housing 112. The shaft 119a also carries a sprocket 119b connected by an endless drive chain 119c to a rotary hydraulic motor 120 mounted on the housing 112. The motor 120 is operable to rotate the pinion 119 and, by engagement of the pinion 119 with the rack 118, to cause the main arm 117a to move longitudinally relative to the housing 112, thereby extending or retracting the felling boom assembly 117 relative to the housing 112.

The forward end of the main arm 117 carries a felling head 121 which is pivotally connected to the main arm 117a by a horizontal shaft 122. A linear hydraulic actuator 123 has one end pivotally connected to the main arm 117a and has the other end pivotally connected to the felling head 121. The actuator 123 is operable to pivot the felling head 121 about the shaft 122.

The felling head 121 is shown in more detail in FIGS. 22—24 and includes a housing 122a mounted on shaft 122, the actuator 123 being pivotally connected to the housing 122a. The felling head 121 also includes a pair of upper pivoted jaws 124, 125 and a pair of lower pivoted jaws 126, 127. The upper and lower jaws 124, 126 are carried by a vertical shaft 128 rotatably mounted in the housing 122a, are carried by a vertical shaft 129 rotatably mounted in the housing 122a. A linear hydraulic actuator 130 has one end pivotally connected to the upper jaw 124 and the other end pivotally connected to the upper jaw 125. The actuator 130 is operable to open and close the upper jaws 124, 125 with consequent opening and closing of the lower jaws 126, 127.

Felling head 121 also includes a pair of relatively-movable butt shear cutters 131, 132 pivotally mounted on a housing 122a below the lower jaws 126, 127. Each cutter 131, 132 is operated by a linear hydraulic actuator 133, 134 respectively pivotally connected to the housing 122a and to the respective cutter 131, 132. The various hydraulic actuators and motors previously mentioned in connection with the felling boom assembly 117 are powered by a hydraulic pump located on the carrier and controlled by a suitable valve mechanism located in the operator's cabin 107.

The boom carrying assembly 112 carried two vertical support brackets 135, 136 which are located near the opposite side of the housing 112 to the felling boom assembly 117. Also located on the housing 112 is a cradle arm bracket 137 for supporting a felled tree trunk. The cradle bracket 137 extends from the support bracket 136 across the housing 112 and projects from the side of the housing 112 carrying the felling boom assembly 117. The support brackets 135, 136 carry a fixed horizontal shaft 138, movement of the shaft 138 in the brackets 135, 136 being prevented by a key number 139.

A limbing boom assembly 140 includes an inner limbing boom arm 141 pivotally mounted at one end on the main shaft 138. The other end of the inner limbing boom arm 141 is pivotally connected to one end of an out limbing boom arm 142 by a shaft 143. The shaft 143 is rotatable mounted on the inner limbing boom arm 141 and is keyed to the outer limbing boom arm 142. The shaft 143 allows relative pivotal movement of the boom arms 141, 142 about a horizontal axis. The other end of the outer limbing boom arm 142 carries a limbing head 144 which will be described in detail later.

The inner limbing boom arm 141 (FIG. 19) contains a first sprocket 145 keyed to the main shaft 138, and a second sprocket 146 keyed to the shaft 143. The ratio of the diameter and of the number of teeth of the first sprocket 145 to the second sprocket 146 is two to one. A linear hydraulic actuator 147 has its cylinder 148 secured to the inner limbing boom arm 141, and has its piston rod 149 projecting from opposite ends of the cylinder 148. A roller chain 150 has one end secured to one end of piston rod 149, passes around sprockets 145 and 146, and has its other end secured to the other end of piston rod 149. The linear hydraulic actuator 147 is powered by a hydraulic pump mounted on the carrier 101 and controlled by suitable valve mechanism located in cabin 107. Actuation of the linear hydraulic motor 147 causes pivotal movement of the booms 141, 142 such that pivotal movement of the outer limbing boom arm 142 relative to the inner limbing boom arm 141 is twice that of the pivotal movement of the inner limbing boom arm 141 relative to the main shaft 138, and the path of movement of the outer end of the outer boom arm 142 which carries the limbing head 144 in a straight line.

An alternative method of providing the required movement of the limbing boom arms 141, 142 would be to substitute a first and second worm gear in place of the first and second sprockets 145, 146, and to replace the actuator 147 and chain 150 by a hydraulic motor driven shaft having a worm engaging the first worm gear on one end and a second worm engaging the second worm gear on the other end, the ratio of the teeth of the first and second worm gears being two to one.

The limbing head 144 is shown in more detail in FIGS. 25 to 27 and includes a housing 151 secured to the other limbing boom arm 142 by a shaft 152. The housing 151 carries three pivotally-mounted hydraulically-actuated parts, namely a topping shear 153, an upper limbing jaw carrier 154 and a lower limbing jaw 155. The topping shear 153 is a cutter operable by a linear hydraulic actuator 156 to cut through a tree trunk, one end of the actuator 156 being pivotally connected to the housing 151 and the other end being pivotally connected to the topping shear 153. The upper limbing jaw carrier 154 carries two pivotally-mounted spaced upper jaws 157, 158 to which opposite ends of a linear hydraulic actuator 159 are respectively, pivotally connected in such a manner that the actuator 159 can be operated to cause relative movement of the jaws 157, 158. The jaw carrier 154 is movable by a linear hydraulic actuator 160 whose opposite ends are respectively pivotally connected to the carrier 154 and to the housing 151. Similarly, the lower jaw 155 is movable by a linear hydraulic actuator 161 whose opposite ends are respectively connected to the jaw 155 and to the housing 151.

The jaw carrier 154, the jaws 157, 158 and the jaw 155 can be moved by their respective actuators between an open position in which a tree 162 can be positioned between them and a closed position in which the jaws 155, 157, 158 surround the tree 162. In the closed position, the jaws 157, 158 project respectively into an aperture 163a in the jaw 155 and an aperture 163b in the housing 151. The actuators 159, 160, 161 are powered by a hydraulic pump on the carrier 101 and are controlled by means of suitable valve mechanism located in the cabin 107. The actuator 156 which operates the topping shear 153 is powered from a hydraulic pump on the carrier and is controlled by an automatic mechanism which energizes the actuator 156 to cause the topping shear 153 to cut through the tree trunk 162 when the jaw carrier 154 and the lower jaw 155 have closed to a relative position indicating a predetermined minimum diameter. This automatic action also cuts off power to the limbing boom actuator 147. The lower jaw 155 is pivotally arranged in such a manner that, when it is moved to the open position (as shown in dotted outline in FIG. 26) the tree trunk 162 is released by downward movement from the jaws 157, 158.

The limbing head 144 is capable of angular movement about shaft 152 and is self aligning, being either ballasted and/or spring-loaded in such a manner that when free it returns to a desired position for tree trunk engagement. Once clamped on the tree trunk, the limbing head 144 assumes the angle of incidence dictated by the lay of the tree trunk.

The rear part 103 of the carrier 101 supports a log cradle 165 which includes a base 166 mounted for rotation about a vertical axis of the rear part 103, a first pair of clamps 167, 168 on one side of the base 166 and a second pair of clamps 169, 170 on the opposite side of the base 166. One end of clamp 167 is pivotally secured to the base 166, and the other end of clamp 167 is pivotally secured to one end of clamp 168, such that clamp 168 is pivotable relative to clamp 167 and clamp 167 is pivotable relative to the base 166 about horizontal axes. Clamps 169, 170 are similarly connected to the base 166 and to clamp 169 respectively. The pairs of clamps 167, 168 and 169, 170 face one another and are movable by hydraulic actuators (not shown) between an open position in which limbed and topped tree trunks 162 can be placed on base 166 and a closed position in which the clamp 167, 168 and 169, 170 hold tree length 162 on the base 166 as they are transported by the machine. The hydraulic actuators for operating the clamps 167, 168 and 169, 170 and the mechanism for rotating the base 166 are powered by a hydraulic pump mounted on the carrier 101 and controlled from the operator's cabin 107.

The operation of the machine will now be described with reference of FIGS. 28 to 36 as well as to FIGS. 19 to 27. The operator positions the machine in front of the tree 162 (FIG. 28) swings the boom-carrying housing 112 into line with the tree, and tilts the housing 112 to such an angle that the felling boom assembly 117 can be extended to approach the butt of the tree 162. The upper and lower jaws 124, 125 and 126, 127, are then caused to grip the tree trunk 162 near the ground. The operator then actuates the butt shears 131, 132 to sever the tree trunk 162.

Figure 29:
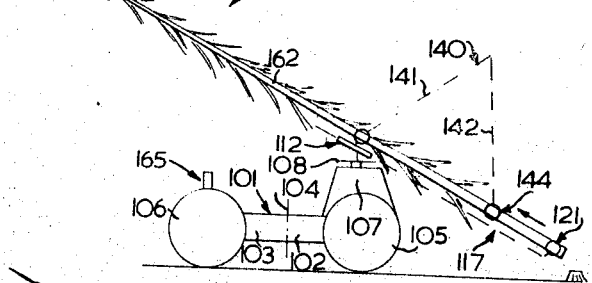

At this stage, the limbing boom assembly 140 is in a tree receiving or cycle starting position, which is adjustable by the operator by means of actuator 147. The upper jaw carrier 154 of the limbing head 144 is in the open position. The felling head 121 is then rotated by operation of actuator 123 until the severed tree trunk 162 has been moved to an inclined position in which it rests on the cradle bracket 137 on the housing 112. The tree trunk 162 now engages the housing 151 of the felling head 144, and the jaw carrier 154, upper jaws 157, 158 and lower jaws 155 are then moved to the closed position (FIG. 29).

Figure 30:
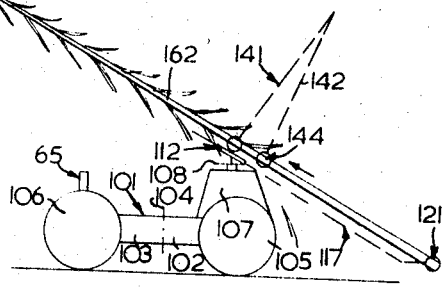
Figure 31:
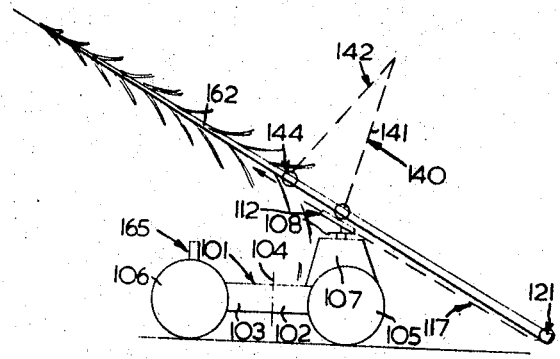
Figure 32:
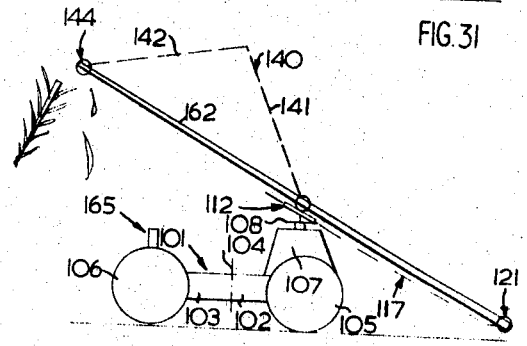

The hydraulic actuator 147 which actuates the limbing boom assembly 140 is then energized to cause movement of limbing boom arms 141, 142 such that the limbing head 144 moves in a straight line along the tree trunk 162, thereby removing the limbs from the tree trunk. During this stage of the operation, the outer boom arm 142 passes the inner boom arm 141 (FIGS. 30 and 31). The inner and outer limbing boom arms 141, 142 are equal in length and, since the main shaft 138 is spaced above the cradle 137, on which the tree trunk 162 rests, the tree trunk 162 is momentarily raised from the cradle 137 by the limbing head 144 as the outer boom arm 142 passes the inner boom arm 141. When the limbing head 144 reaches a position near the top of the tree trunk 162 at which the jaw carrier 154 and lower jaw 155 have closed to the preset diameter for cutoff, hydraulic power to actuator 147 is automatically cut off and movement of the limbing boom assembly 140 ceases. At the same time, the topping shear 153 is automatically actuated to sever the top portion of the tree 162 (FIGS. 19 and 32).

Figure 33:
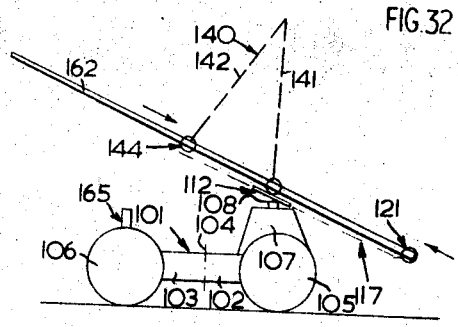
Figure 34:
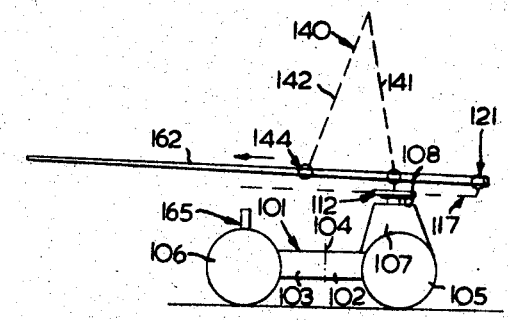

The operator now reverses the direction of travel of the limbing head 144. At the same time, the felling boom assembly 117 is retracted to move the now felled, limbed and topped tree trunk 162 rearwardly, the tree trunk 162 sliding over cradle bracket 137 (FIG. 33). Also, the boom-carrying housing 112 is returned to a horizontal position so as to place the tree trunk 162 in a horizontal position (FIG. 34). Further, the operator rotates the platform 108, thereby rotating the boom assemblies 140, 117 and the tree 162, until the tree trunk 162 has been aligned with the longitudinal axis of the machine and is over the log cradle 165.

Figure 35:
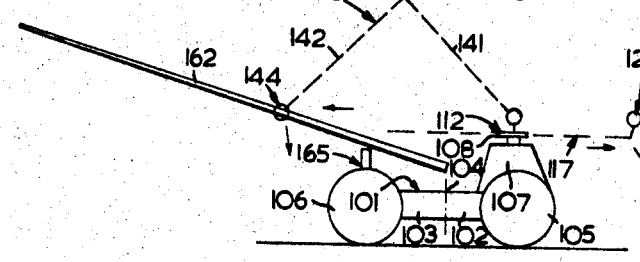
Figure 36:
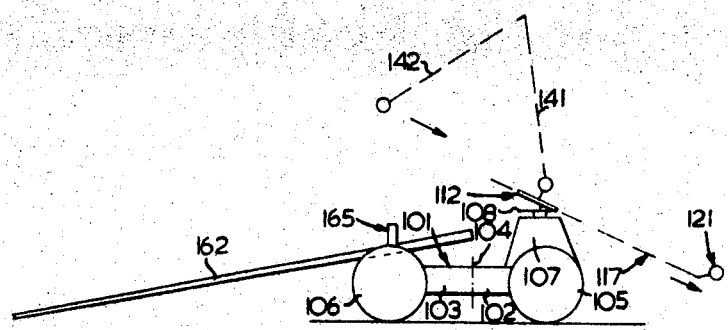

When the limbing head 144 has been returned to approximately the midpoint of the tree, movement of the limbing boom assembly 140 is stopped and the operator causes the jaws 124, 125 and 126, 127 of the felling head 121 to release the tree trunk 162. The operator then causes the limbing boom assembly 140 to travel in the reverse direction so as to carry the tree trunk 162 rearwardly across the cradle bracket 137 of the housing 112 until the butt end of the tree trunk 162 clears the housing 112 (FIG. 35). The tree 162 is now released from the limbing head 144 by opening the lower limbing jaw 155 (as shown in dotted outline in FIG. 26), and is dropped or placed between clamps 167, 168 and 169, 170 of log cradle 165 (FIG. 36).

This tree harvesting and loading cycle is repeated until all the trees within reach have been harvested. The operator then secures the load by causing the clamps 167, 168 and 169, 170 to grip the load, and can then drive the machine to another position from which further trees are harvested. When the log cradle 165 is full, the machine is driven to a suitable position, and the logs are deposited.

If desired, after limbing and topping, a tree trunk may be transferred to the log cradle 165 without using the limbing boom assembly 140. After limbing and topping, the limbing head 144 is freed from the tree trunk 162 and with the tree trunk 162 held by the felling head 121, the platform 108 is rotated through approximately 180°. The main arms 117a of the felling booms assembly 170 is retracted to bring the felling head 121 into position between the cabin 107 and the log cradle 165, and at the same time the felling head is rotated about shaft 122 to bring the tree trunk 162 to a near upright position. The felling head 121 is then further rotated until the tree rests upon the log cradle 165 and the felling head jaws are caused to release the tree trunk 162.

In the described embodiment, the felling boom assembly 117 included a main arm 117a of fixed length which is retracted and protracted relative to the housing 112 by a rack and pinion assembly 118, 119 driven by a hydraulic motor 120. If desired, this arrangement may be replaced by an arrangement including cables passing around sheaves and driven by a hydraulic winch or actuator. Alternatively, the main arm 117a of the fixed length may be replaced by a telescopic arm. Suitable means for extending and contracting the telescopic arm would be carried by the housing 112 and/or the telescopic arm.

I claim:

1. A tree harvesting machine including a mobile carrier, a felling boom assembly pivotally mounted on the carrier and operable to grip a tree trunk above a severing location and to sever the tree trunk at the severing location, and a limbing boom assembly pivotally mounted on the carrier and operable to remove limbs from a felled tree held by the felling boom assembly.

2. A tree harvesting machine according to claim 1 wherein the felling boom assembly includes an inner arm pivotally secured at one end to the carrier for movement about a horizontal axis, an outer arm pivotally secured at one end to the opposite end of the inner arm for movement relative thereto about a horizontal axis, a felling head pivotally secured to the opposite end of the outer arm for movement relative thereto about a horizontal axis, said felling head including means for gripping a tree trunk above a severing location and means for severing the tree trunk at the severing location, and means for effecting pivotal movement of the inner arm, outer arm and felling head.

3. A tree harvesting machine according to claim 2 wherein the gripping means of the felling head includes two spaced pairs of jaws arranged to grip a tree trunk at positions spaced along the length of the tree trunk.

4. A tree harvesting machine according to claim 1 wherein the limbing boom assembly includes an inner arm pivotally secured at one end to the carrier for movement about a horizontal axis, an outer arm pivotally secured at one end to the opposite end of the inner arm for movement relative thereto about a horizontal axis, a limbing head pivotally secured to the opposite end of the outer arm, said limbing head including means operable to remove limbs from a tree, and means for effecting pivotal movement of the inner arm, outer arm and felling head.

5. A tree harvesting machine according to claim 4 wherein the limbing head also includes means for severing the trunk of a tree.

6. A tree harvesting machine according to claim 5 wherein the limbing head includes means responsive to tree diameter to cause said severing means to sever the trunk of a tree during a limbing operation when the limbing head reaches a portion of the trunk having a predetermined minimum diameter.

7. A tree harvesting machine according to claim 4 wherein the limb removing means includes a housing, and jaws pivotally mounted on the housing, said jaws and housing being operable to surround a tree trunk.

8. A tree harvesting machine according to claim 7 wherein the limbing head also includes means for severing the trunk of a tree, means operable to urge at least one of the jaws towards the housing in a trunk-diameter-sensing manner, and means responsive to said jaw or jaws reaching a position corresponding to a predetermined minimum trunk diameter to cause said severing means to sever the trunk.

9. A tree harvesting machine according to claim 4 wherein the limb removing means includes a housing, jaws or arms pivotally mounted on the housing, and means operative to open a bottom or lower jaw or arm downwardly to release a tree stem for loading.

10. A tree harvesting machine according to claim 4 wherein the limb removing means includes a housing, and jaws or arms pivotally mounted on the housing, said jaws being fitted with suitable cutting means on the forward edges to facilitate the impact shearing of tree limbs encountered as the limbing head or tool is propelled along tree trunk.

11. A tree harvesting machine according to claim 4 wherein said means for effecting pivotal movement of the inner and outer arms of the limbing boom assembly includes a fixed shaft mounted on the carrier and on which said one end of the inner arm is pivotally mounted, a first sprocket fixed on said shaft, a second shaft and sprocket rotatably mounted adjacent the opposite end of the inner arm, said outer arm being fixed to said second shaft at said one end of the outer arm, a chain member passing around said first and second sprockets, and means secured to opposite ends of the chain for effecting movement thereof to cause angular movement of the inner arm relative to the shaft and angular movement of the outer arm relative to the inner arm, with the outer end of the outer arm travelling in a straight line.

12. A modification of the tree harvesting machine according to claim 9 wherein said means for effecting pivotal movement of the inner and outer arms of the limbing boom assembly includes a first and second worm gear in place of said first and second sprockets, said first and second worm gears being driven by a first and second worm proper, said worms being fixed at either end of a common drive shaft, and said drive shaft being actuated by hydraulic motor means.

13. A tree harvesting machine according to claim 11 wherein the angular position of said fixed shaft and sprocket is adjustable both manually and automatically to suit the angle of repose of a felled tree.

14. A tree harvesting machine according to claim 1 wherein the felling boom assembly and the limbing boom assembly are mounted on a common platform.

15. A tree harvesting machine according to claim 14 wherein the platform is mounted for rotation about a vertical axis.

16. A tree harvesting machine according to claim 14 wherein the felling boom assembly and the limbing boom assembly are mounted adjacent one side of the platform, and a portion of the platform on one side of the felling boom assembly and the limbing boom assembly acts as a support deck for a tree during the limbing operation.

17. A tree harvesting machine according to claim 14 wherein the felling boom assembly and the limbing boom assembly are mounted at spaced positions on the platform and a portion of the platform between the felling boom assembly and the limbing boom assembly acts as a support deck for a tree during the limbing operation.

18. A tree harvesting machine according to claim 1 wherein the felling boom assembly and the limbing boom assembly are carried by a forward portion of the carrier, and a log cradle for receiving felled and limbed trees is mounted on a rear portion of the carrier.

19. A tree harvesting machine according to claim 18 wherein the log cradle includes jaws movable to grip a series of logs in the cradle.

20. A tree harvesting machine according to claim 1 wherein the carrier is an articulated wheeled vehicle.

21. A tree harvesting machine according to claim 1 wherein the carrier is a tracked vehicle.

22. A tree harvesting machine including a mobile carrier, a felling boom assembly including an arm pivotally mounted on the carrier and protractable and retractable relative to the carrier, and a felling head pivotally carried by the arm at an end thereof remote from the carrier, the felling head being operable to grip a tree trunk above a severing location and to sever the tree trunk at the severing location, and a limbing boom assembly pivotally mounted on the carrier and operable to remove limbs from a felled tree held by the felling head.

23. A tree harvesting machine according to claim 22 wherein the felling boom assembly and the limbing boom assembly are carried by a platform mounted on the carrier and rotatable about a vertical axis relative to the carrier.

24. A tree harvesting machine according to claim 22 wherein the felling boom assembly is mounted on a housing carried by the carrier and pivotable about a horizontal axis relative to the carrier.

25. A tree harvesting machine according to claim 24 wherein the limbing boom assembly is also mounted on the pivotable housing.

26. A tree harvesting machine according to claim 25 wherein the felling boom assembly is mounted on the opposite side of the pivotable housing to the limbing boom assembly, and an intermediate part of the housing acts as a support for a tree during the limbing operation.

27. A tree harvesting machine according to claim 25 wherein the pivotable housing is mounted on a platform and is pivotable about a horizontal axis relative to the platform, and the platform is mounted on the carrier and is rotatable about a vertical axis relative to the carrier.

28. A tree harvesting machine according to claim 27 wherein the felling boom assembly is mounted on the opposite side of the housing to the limbing boom assembly, and an intermediate part of the housing acts as a support for a tree during the limbing operation.

29. A tree harvesting machine according to claim 22 wherein the felling boom arm is of fixed length.

30. A tree harvesting machine according to claim 22 wherein the felling boom arm is telescopic.

31. A tree harvesting machine according to claim 29 wherein the felling boom arm is protractable and retractable relative to the carrier by a rack and pinion arrangement.

32. A tree harvesting machine according to claim 22 wherein the felling head includes two spaced pairs of jaws arranged to grip a tree trunk at positions spaced along the length of the tree trunk.

33. A tree harvesting machine according to claim 22 wherein the limbing boom assembly includes an inner arm pivotally secured at one end to the carrier for movement about a horizontal axis, an outer arm pivotally secured at one end to the opposite end of the inner arm for movement relative thereto about a horizontal axis, a limbing head pivotally secured to the opposite end of the outer arm, said limbing head including means operable to remove limbs from a tree, and means for effecting pivotal movement of the inner arm, outer arm and felling head.

34. A tree harvesting machine according to claim 33 wherein the limbing head also includes means for severing the trunk of a tree.

35. A tree harvesting machine according to claim 34 wherein the limbing head includes means responsive to tree diameter to cause said severing means to sever the trunk of a tree during a limbing operation when the limbing head reaches a portion of the trunk having a predetermined minimum diameter.

36. A tree harvesting machine according to claim 33 wherein the limb removing means includes a housing, and jaws pivotally mounted on the housing, said jaws and housing being operable to surround the tree trunk.

37. A tree harvesting machine according to claim 36 wherein the limbing head also includes means for severing the trunk of a tree, means operable to urge at least one of the jaws towards the housing in a tree-diameter-sensing manner, and means responsive to said jaw or jaws reaching a position corresponding to a predetermined minimum trunk diameter to cause said severing means to sever the trunk.

38. A tree harvesting machine according to claim 33 wherein the limb removing means includes a housing, jaws or arms pivotally mounted on the housing, and means operative to open a bottom or lower jaw or arm downwardly to release a tree for loading.

39. A tree harvesting machine according to claim 33 wherein the limb removing means includes a housing, and jaws or arms pivotally mounted on the housing, said jaws being fitted with suitable cutting means on the forward edges to facilitate the impact shearing of tree limbs encountered as the limbing head is propelled along the tree trunk.

40. A tree harvesting machine according to claim 33 wherein said means for effecting pivotal movement of the inner and outer arms of the limbing boom assembly includes a fixed shaft mounted on the carrier and on which said one end of the inner arm is pivotally mounted, a first sprocket fixed on said shaft, a second shaft and sprocket rotatably mounted adjacent the opposite end of the inner arm, said outer arm being fixed to said second shaft at said one end of the outer arm, a chain member passing around said first and second sprockets, and means secured to opposite ends of the chain for effecting movement thereof to cause angular movement of the inner arm relative to the shaft and angular movement of the outer arm relative to the inner arm, with the outer end of the outer arm travelling in a straight line.

41. A modification of the tree harvesting machine according to claim 40 wherein said means for effecting pivotal movement of the inner and outer arms of the limbing boom assembly includes a first and second worm gear in place of said first and second sprockets, said first and second worm gears being driven by a first and second worm proper, said worms being fixed at either end of a common drive shaft, and said drive shaft being actuated by hydraulic motor means.

42. A tree harvesting machine according to claim 22 wherein the felling boom assembly and the limbing boom assembly are carried by a forward portion of the carrier, and a log cradle for receiving felled and limbed trees is mounted on a rear portion of the carrier.

43. A tree harvesting machine according to claim 42 wherein the log cradle includes jaws movable to grip a series of logs in the cradle.

44. A tree harvesting machine according to claim 22 wherein the carrier is an articulated wheeled vehicle.

45. A tree harvesting machine according to claim 22 wherein the carrier is a tracked vehicle.